United States Patent
Jourdain et al.

[11] Patent Number: 5,889,401
[45] Date of Patent: Mar. 30, 1999

[54] METHOD AND APPARATUS FOR DETERMINING THE THICKNESS OF SEVERAL LAYERS SUPERIMPOSED ON A SUBSTRATE

[76] Inventors: Pascal Jourdain, Fältharevägen 47, Västerås S-722 43; Lars Hallstadius, Bastugatan 12, Västerås S-724 81; Kurt-Åke Magnusson, Mäster Jacobs Väg 7, Skultuna S-730 50, all of Sweden; Gerhard Bart, Dörrmattring 3, Frick CH-5070; Hans-Urs Zwicky, Mönthalerstrasse 44, Remigen CH-5236, both of Switzerland

[21] Appl. No.: 679,624

[22] Filed: Jul. 12, 1996

[51] Int. Cl.$^6$ .............................. G01B 7/06; G01N 27/72; G01R 33/12

[52] U.S. Cl. .................... 324/230; 324/207.16; 324/232; 324/233; 702/170

[58] Field of Search .................... 324/207.16, 207.26, 324/229–239; 702/170, 172

[56] References Cited

U.S. PATENT DOCUMENTS

| | | | |
|---|---|---|---|
| 4,673,877 | 6/1987 | Sakamoto et al. | 324/230 X |
| 4,695,797 | 9/1987 | Deutsch et al. | 324/230 |
| 5,017,869 | 5/1991 | Oliver | 324/230 |
| 5,191,286 | 3/1993 | Fischer | 324/232 X |
| 5,453,689 | 9/1995 | Goldfine et al. | 324/230 X |
| 5,525,903 | 6/1996 | Mandl et al. | 324/230 |

FOREIGN PATENT DOCUMENTS

| | | |
|---|---|---|
| 30 22 078 | 1/1981 | Germany . |
| 61-237052 | 10/1986 | Japan .................. 324/230 |
| 2 187 844 | 9/1987 | United Kingdom . |

OTHER PUBLICATIONS

Higuchi et al., Effect of Nodular Corrosion Density on Thickness Measurement by Eddy–Current Technique, pp. 749–756, undated.

Eddy Current Inspection of Non–Ferromagnetic Tubing Zetec Level II, Course ETS 200, 64 pages.

*Primary Examiner*—Gerard Strecker
*Attorney, Agent, or Firm*—Pollock, Vande Sande & Priddy Amernick

[57] ABSTRACT

A method and apparatus for determining the thickness of at least one layer superimposed on a substrate, at least one of the layers or the substrate being a conductor of electricity. The method includes the steps of generating an electromagnetic alternating field in the vicinity of the outer most layer with a coil in order to cause any currents to be generated in the conductor which act upon the alternating field. The frequency of the alternating field is adjusted to at least two different frequencies and is measured at these frequencies. The thickness of the layers is then determined based on the measurements and the electromagnetic properties of the substrate and the layers.

24 Claims, 4 Drawing Sheets

METHOD AND APPARATUS FOR DETERMINING THE THICKNESS OF SEVERAL LAYERS SUPERIMPOSED ON A SUBSTRATE

FIELD OF THE INVENTION

The present invention relates to a method for determining the thickness of one or several layers superimposed on a substrate, at least one of the layers or the substrate being a conductor of electricity, in which an electromagnetic alternating field is generated in the immediate vicinity of the outermost of the layers so that this field generates eddy currents in the conducting layer retroacting upon the field, and the influence of these eddy currents upon the alternating field is measured and the thickness of the layer or the layers is determined on the basis of this measurement. The invention is also directed to a device for practicing the method.

BACKGROUND OF THE INVENTION

A method and a device of this kind may be used for measuring the thickness of one or several layers within different areas, and the only condition is that at least one of the layers or the substrate is a conductor of electricity, so that the electromagnetic alternating field will generate eddy currents when penetrating through that layer or the substrate. It should be noted that when reference is made to a "conducting layer" this phrase is intended to include within its scope the substrate. To illuminate, but not in any way to restrict the scope of the invention, the particular use of such a method and such a device for measuring the thickness of layers created on substrates constituted by fuel rods in nuclear power reactors will be discussed hereinafter, although this is not in any way to be interpreted as limiting the scope of the invention.

Such reactor fuel rods used in nuclear power reactors are usually made of a zirconium alloy (Zircalloy) and contain the fuel itself, usually in the form of a number of small sintered pellets of uranium dioxide. In the very reactive environment surrounding these fuel rods, various chemical reactions will take place, of which one is the formation of a layer of zirconium dioxide outside the zirconium alloy itself. This layer grows inwardly so that the thickness of the substrate will gradually be reduced at the same time that the thickness of the oxide layer increases. A so called "crud" layer is also produced outside the oxide layer, and this consists usually of a mixture of Fe, Zn and O. It is extremely important that the development of the thickness of the oxide layer be under control since this may, primarily for security reasons, not exceed a determined value. If this is the case, the fuel rod has to be taken out of the reactor and a new fuel rod introduced.

Due to the fact that the substrate in this case is a conductor of electricity and since it consists of the above-mentioned zirconium alloy, the method according to the introduction may be used for determining the thickness of the oxide layer. When doing so, it has heretofore been that a coil generates an electromagnetic alternating field with a certain frequency close to layers having different thicknesses at the same time as any quantity of the alternating field is measured, such as the current flowing through the coil at a predetermined voltage thereacross, for calibration of the measuring coil. The eddy currents generated by the alternating field in the conducting substrate will disturb the alternating field itself, and this disturbance is reduced with increasing distance between the coil and the substrate, i.e., with the thickness of the oxide layer and the crud layer possibly located thereupon. However, it has turned out that the results obtained through these measurements have been confusing, since it seems as if layer thicknesses which are much too large have been indicated. It could be established by studying the fuel rods in question through different methods that, in such cases, the measurement has often grossly overestimated the layer thicknesses being measured.

Thus, the use of this known measuring method means that fuel rods will be taken away and changed unnecessarily early with high additional costs as a consequence, and it will at the same time, not be possible to really rely on the obtained measurement results and it will not be possible to carry out any reliable studies of the oxide formation rate and how this is developed for different types of zirconium alloys.

It may also be mentioned that grossly overestimated values of the oxide thicknesses have been produced, especially in reactors in which zinc has been measured in so as to reduce the radiation doses in circulation and auxiliary systems.

SUMMARY OF THE INVENTION

The object of the present invention is to provide a method, and a device for remedying the inconveniences mentioned of the above described methods and devices already known and which enables a reliable determination of the thickness of one, or several layers by using the so-called "eddy current method".

This object is according to the invention, obtained by carrying out a measurement in a method of the type defined in the introduction hereof by adjusting the frequency of the alternating field to at least two different values, and the alternating field result from the retroaction is measured at these frequency values. The thickness of the layer, or layers, is calculated on the basis of data obtained by the measurement last mentioned and information about at least some of the electromagnetic properties of the substrate and the layer or the layers.

By carrying out the measurement in question at different frequencies, it may first be excluded that the thickness value determined will be grossly overestimated, since a comparison of the measurements at the different frequencies will directly show that there is something that is disturbing the measurement. If this is the case, this will result in a false result when using the calibration method described above.

The invention is primarily based on the understanding that it is the electromagnetic properties of the substrate and the layer or the layers that interact with the alternating field for influencing the retroaction of the eddy currents upon the alternating field. By measuring the alternating field at different frequency values, and considering these values and the information about the electromagnetic properties in the calculation of the thickness of the layer or layers, it is possible to determine the thickness of the layer or the layers with a high reliability.

The inventors have discovered that it is the magnetic permeability of the crud layer that has been the problem in the specific case described above. This explains why the layer thicknesses measured have been grossly overestimated, particularly in reactors in which zinc is incorporated, since additions of zinc make the crud magnetic. If any of the layers, in this case the crud layer, is magnetic, this will counteract the influence of the eddy currents upon the alternating field and the alternating field will therefore appear as if the conducting layer, in this case the substrate, were located at a larger distance from the origin of the electromagnetic alternating field than really is the case. As a result, a large thickness of the oxide layer appears to be present when using the prior art method. However, this is avoided by the present invention, since the electromagnetic properties, such as the dielectric constant, the electric conductivity, and the magnetic permeability of the substrate and the different layers are considered in the calculation of the layer thickness. It is, of course, readily possible that one or some of these parameters will not influence the result in a noticeable degree in a given situation for measuring the thickness of the given layer and may thereby be set to comparatively arbitrary values. It is also not necessary that the electromagnetic properties are known before, but some of them could be derived through calculation, and it is also possible that particular means are arranged for measuring, for instance, the magnetic permeability of any of the layers. Also, it is possible to determine the thickness of a plurality of superimposed layers in this way.

According to a preferred embodiment of the invention, the calculation of the thickness takes placed by using a mathematical model describing a coil used for generating the alternating field, and a mathematical model relating to the constitution of the substrate and the layer or layers and the influence thereof upon the alternating field generated by the coil. Fixed values for at least some of the electromagnetic properties of the substrate and the layer or the layers are introduced into the mathematical model last mentioned. By using such a mathematical method for the coil that generates the alternating field and a mathematical model for the parts influenced by the alternating field and which influence the alternating field, it is possible to determine the thickness of the layers with a high accuracy, while considering the disturbances that may be caused by the substrate and the layer, or layers, which influence the eddy currents upon the alternating field. Thus, it has been found that it is advantageous to design a coil for generating the alternating field so that it will be readily simulated through a mathematical model.

According to another preferred embodiment of the invention, a mathematical inversion model is used as the mathematical model for the substrate and the layer or layers. An estimated thickness of the layer in question is introduced into the model on the calculation of the layer thickness. The alternating field is calculated through the mathematical model for the coil and the mathematical inversion model. The result obtained through this calculation is compared with the result of the measurement of the alternating field, whereupon a new value for the thickness is introduced into the mathematical inversion model. This procedure is repeated until substantial correspondence is obtained between the measured and the calculated alternating field. A method based upon such an inversion algorithm leads to an unambiguous determination of the parameters that are unknown, and a reliable value may, in this way, be obtained for the thickness of one, two, or an even greater number of layers.

According to another preferred embodiment of the invention, it is one, or several, of the dielectric constant, the electric conductivity, and the magnetic permeability of the substrate and the layer or the layers that are used as the electromagnetic properties in the calculation of the thickness of the layer or layers. It is then, for example, possible to disregard some of these parameters and set them very low. If, in practice, they have no real influence upon the retroaction of the eddy currents upon the alternating field they can be neglected with respect to the corresponding electromagnetic property of any of the other layers or the like. It is extremely important that the magnetic permeability be used for the calculation in the case described above and for the problems connected thereto.

According to another preferred embodiment of the invention, measurements of the alternating field are carried out over a broad frequency range extending over one or several orders of magnitude. An adjustment of the alternating field over a broad frequency range increases a possibility of obtaining considerable differences in the parameters of the alternating field depending on the frequency, and of obtaining an exact and reliable determination of the layer thickness.

According to another preferred embodiment of the invention, the electromagnetic alternating field resulting from retroaction of the eddy currents generated thereby, is measured by measuring the impedance of at least a receiver coil placed close to the outermost layer and the phase difference of a voltage across the receiver coil with respect to a current flowing through a coil used for generating the alternating field. Reliable data useful for the calculation of the thickness may, in this way, be obtained by a simple means through the understanding that the impedance and the phase difference of such a receiver coil properly describe the alternating field and the influence the eddy current has thereupon, at the same time that these quantities are dependent upon the frequency of the alternating field.

According to a very preferred embodiment of the invention, the same coil that is used to generate the electromagnetic alternating field is used as the receiver coil. This simplifies the measuring method and makes the device according to the invention simple and easy to handle, while limiting possible sources of errors.

According to a preferred embodiment of the invention, the impedance and phase differences are measured by measuring the intensity of the current through the coil generating the alternating field and the amplitude and the phase position of the voltage across the receiver coil with respect to the current. The alternating field may, in this way, be easily and reliably measured by measuring the amplitude and phase position of the voltage across the receiver coil. This measurement is particularly simple in the case where a single coil is used to generate the electromagnetic field and as the receiver coil. Accordingly, the expression herein, "the alternating field is measured", means that it may also be measured indirectly, such as in this case, by measuring the impedance and the phase difference, and these quantities are also measured indirectly by measuring the amplitude and the phase position of the voltage. It is then readily possible to determine exactly the impedance and the phase difference. However, it could well be that none of these are ever determined, but it may instead be sufficient to determine values for the inductance of the receiver coil in the form of a real part and an imaginary part, and the phase difference as arc tangent of the imaginary part, divided by the real part for different frequencies of the alternating field, and thereby indirectly the impedance of the coil, since the inductance is decisive for the impedance of the coil at a certain frequency. The capacitive coupling between the coil and the layers and the substrate may normally be disregarded and a restriction to the inductive coupling therebetween may take place in the calculations.

According to a preferred embodiment of the invention, it is the thickness of a layer of a metal oxide on a substrate in the form of an alloy of a metal in the form of a wall of a fuel rod in a nuclear power reactor that is determined. This constitutes a particularly preferred use of the method according to the invention. The determination of the thickness of the oxide layer is then advantageously carried out with a layer of at least partially magnetic crud arranged on top of the oxide layer, and the magnetic permeability of this crud layer is considered in that calculation. The problem mentioned above in the method already known applied on oxide thickness measuring of fuel rods may in this way be solved, and a reliable thickness value of the oxide layer may be obtained so that the fuel rod may be utilized for an optimum period before it has to be removed from the reactor for change. Also, the oxide formation rate for the material presently used for the fuel rod may be studied for a suitable evaluation.

The problem described above is also solved by providing a device according to the invention. The features of such a device, and its advantages appear clearly from the discussion above of the method according to the invention and the different embodiments thereof.

According to a preferred embodiment of the invention, the alternating field generating members comprise a coil describable by a mathematical model, and the arrangement is adapted to use this mathematical model in its calculation. It is then advantageous to provide a coil having a single layer of winding turns, since this may be easily described by a mathematical model, and this mathematical model becomes particularly simple when constructed to describe the coil in the form of an equivalent coil having a single winding turn.

According to another preferred embodiment of the invention, a mathematical model describes the coil through at least two equivalent coils in the form of a transmitter coil and at least one receiver coil. The equivalent coils then advantageously have a single winding turn for simplifying the calculations.

Further advantages and preferred features of the invention appear from the following description.

BRIEF DESCRIPTION OF THE DRAWINGS

With reference to the appended drawings, below follows a description of a preferred embodiment of the invention cited as an example.

In the drawings.

DETAILED DESCRIPTION OF PREFERRED EMBODIMENTS OF THE INVENTION

Figure 1:
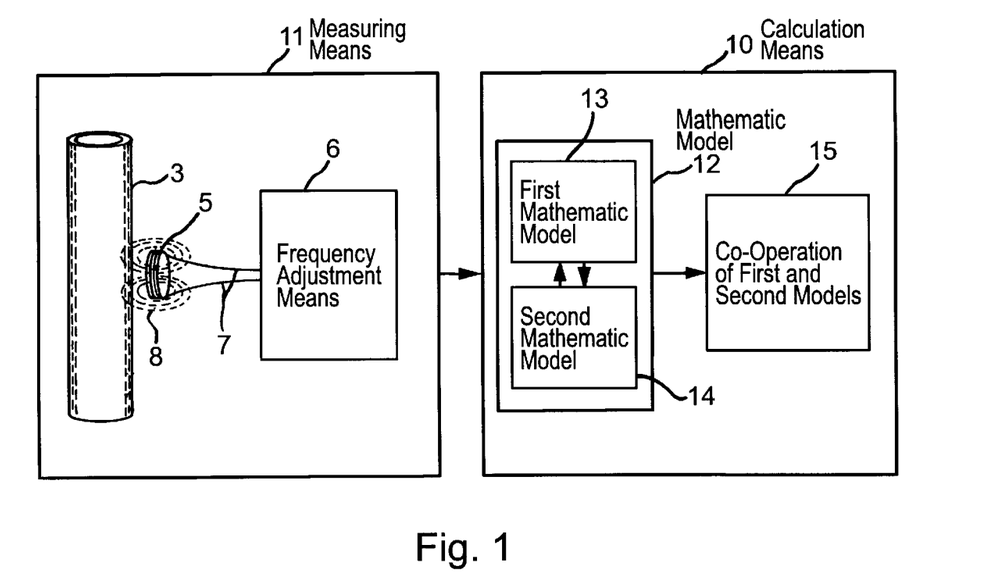
FIG. 1 is a simplified diagram illustrating the construction of a device according to a preferred embodiment of the invention, by means of which a method according to a preferred embodiment of the invention may be carried out.

The constitution of a device according to a preferred embodiment of the invention for determining the thickness of one of several layers superimposed on a substrate by the so-called EC-method (EC=Eddy Current) is schematically illustrated in FIG. 1. The thickness of the oxide layer 1 formed on a substrate 2 in the form of a wall comprising a zirconium alloy of a fuel rod 3 used in a nuclear power reactor (see also FIG. 2) is measured in the present case. Furthermore, a so-called "crud" layer 4 is arranged outside the oxide layer 1, and this crud layer usually consists of a mixture of Fe, Zn and O, which may have a composition comparable to $ZnFe_2O_4$. The oxide layer is, in the present case, zirconium dioxide. Cooling water is intended to flow inside the layer 2 and outside the layer 4 for cooling the fuel rod walls heated by the cleaving of the fuel in the fuel rods.

The device comprises a coil 5, which is formed by a wire of a material being a conductor of electricity wound in turns in one layer, so that it will be readily possible to describe the coil by a mathematical model. This coil 5 is connectable to a unit 6 arranged to apply an alternating voltage of adjustable frequency across the terminals 7 thereof. An electromagnetic alternating field may, in this way, be generated through the coil 5, which is indicated through magnetic flux lines 8. The coil 5 is intended to be moved to the immediate vicinity of the outermost 4 of the layers. The flux lines 8 of the alternating field will thereby pass through the layers, as illustrated schematically in FIG. 2, and eddy currents will, in a known way, be generated in layer 2 which is a conductor of electricity k penetrated by the flux lines 8 substantially perpendicular. This is indicated very schematically by rings 9 (these currents are in reality to be described through considerably larger eddy current paths than the one shown), the eddy current losses so obtained in the layer are proportional to, among other things, the square of the thickness of the layer which is the conductor of electricity in a direction perpendicular to the magnetic flux lines and the current density in the layer. The thickness of the substrate normally has no influence, since this will often be so large that it may be considered to be infinite.

Figure 2:
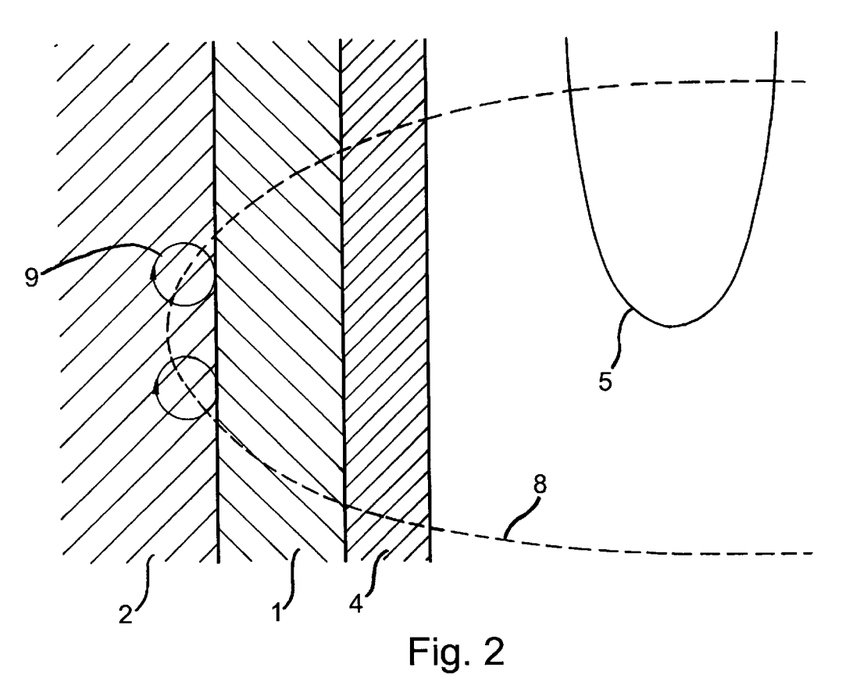
FIG. 2 is a very simplified view illustrating the principles of the so called eddy current method.

The eddy currents generated in this way will retroact upon the alternating field so that the appearance thereof will depend thereupon. This influence depends upon the distance between the coil 5 and the layer 2 which is a conductor of electricity, and therefore, at a certain distance between the coil and the outer border of the layer 1, dependent upon the thickness of the oxide layer 1. The electromagnetic properties, such as the dielectric constant, the electric conductivity, and the magnetic permeability of the substrate and the different layers, influence the character and the retroaction of the eddy currents upon the alternating field. If, for instance, any of the layers is magnetic, such as is presumed to be in the present case for the crud layer 4, this layer will then partially neutralize the influence of the eddy currents upon the alternating field, so that the alternating field, upon measuring at a single frequency, provides an appearance similar to the case in which the crud layer is not magnetic but the thickness of the oxide layer 1 is considerably larger than is the case in reality.

The device according to the invention also comprises means in unit 6 adapted to measure the alternating field as well as members for adjusting the frequency for the alternating field to carry out the measuring at different frequencies within a broad frequency range, preferably extending over one or several orders of magnitude, and in the present case, frequencies between 100 kHz and 20 MHz are used. The measuring takes place by measuring the intensity of the current flowing through the coil, and the amplitude and phase position of the voltage across the coil 5, in which the phase position is identical to the phase of the voltage with respect to the current through the coil. Since it is assumed that the coil only couples inductively to the layers and the substrate, it may be said that it is the inductance of the coil that is measured.

The device comprises an arrangement 10 arranged to calculate the thickness of the layer 1, or the layers 1 and 4, on the basis of data from the measuring and information about at least some of the electromagnetic properties of the substrate and the layer or layers. This arrangement receives measuring data from the measuring arrangement 11. The calculation arrangement 10 comprises a mathematical model illustrated by a box 12, which is formed by a mathematical model 13 describing coil 5 and a mathematical inversion model 14 described below. The result, in the form of layer thicknesses, is obtained by cooperation of the mathematical models 13 and 14, which is indicated by square 15. The entire arrangement 10 would advantageously in practice be formed by a calculation computer.

Figure 3:
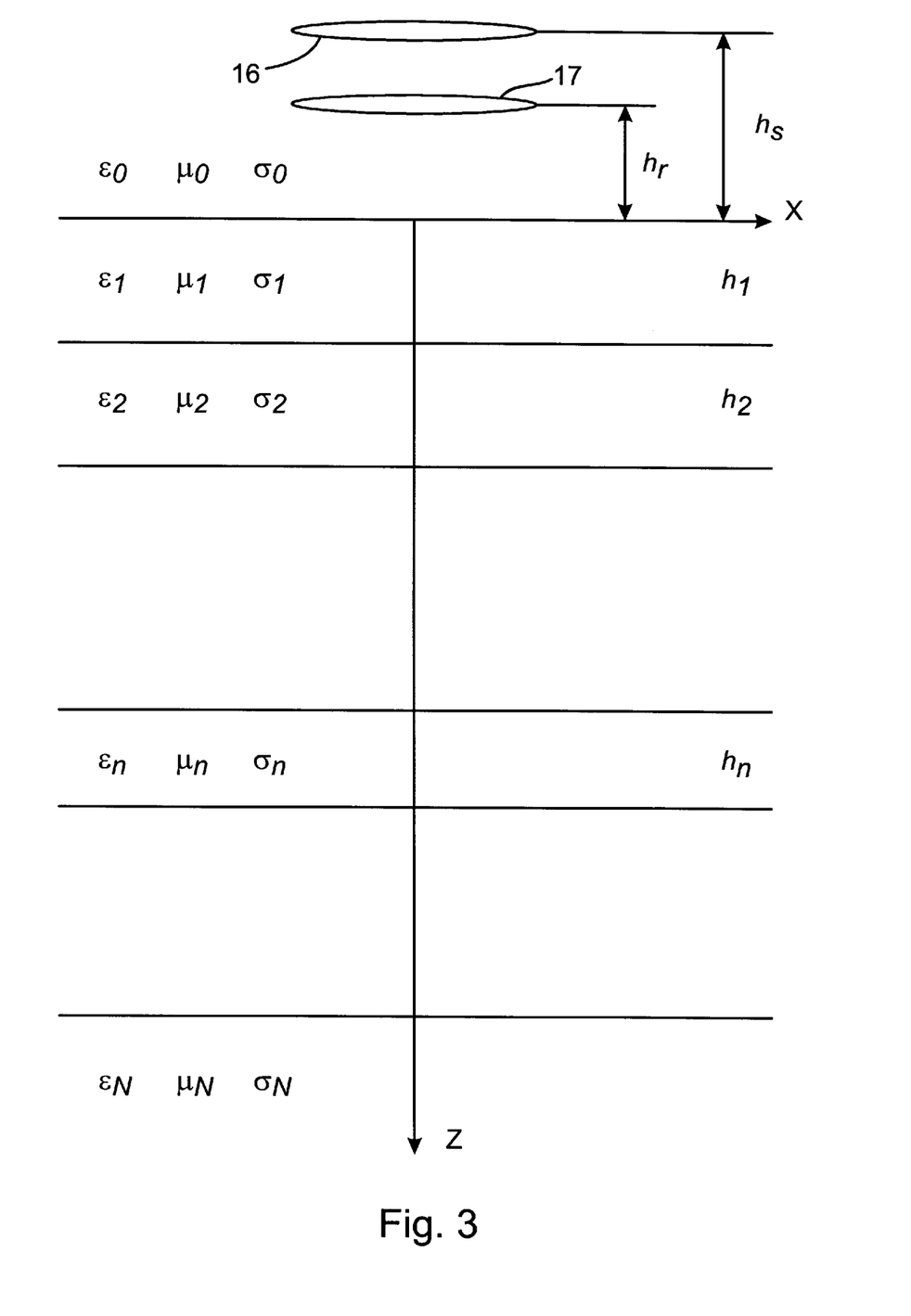
FIG. 3 is a view illustrating equivalent coils and layers used in a mathematical inversion model according to the invention for calculating the thickness of the layers.

The mathematical model for the coil is adapted to describe the coil in the form of an equivalent coil having a single winding turn. It describes the coil more exactly through two equivalent coils in the form of a transmitter coil and a receiver coil, and the transmitter coil will, accordingly, have the characteristics with respect to the alternating field and the like that it would have in absence of any influence from the different layers and the substrate, and the receiver coil will have the characteristics that the coil gets through such influence. It is illustrated in FIG. 3 how the mathematical model describes the coil in this way in the form of a transmitter coil 16 and a receiver coil 17, which are located at distances $h_S$ and $h_r$, respectively, from the outermost layer. The dielectric constant $\epsilon$, the magnetic permeability $\mu$ and the electric conductivity $\sigma$ are mentioned in FIG. 3 as electromagnetic properties of each of the layers and the cooling water outside the outermost layer and inside the innermost layer. These electromagnetic properties are introduced into the mathematical inversion model, which is used as a mathematical model relating to the constitution of the substrate and the layers and the influence thereof upon the alternating field generated by the coil.

According to the invention, it is intended that a theoretical value is calculated for the alternating field through the mathematical model for the coil and the mathematical inversion model and the result obtained in this calculation is compared with the result of the measuring of the alternating field, the calculation being made with measurements at different frequencies in which, in this calculation, a presumed thickness for the layer in question is introduced into this model, whereupon a new value for the thickness is introduced into the mathematical inversion model and this procedure is repeated until a substantial correspondence is obtained between the measured and the calculated alternating field. This iteration process is advantageously automatically carried out by a computer program until the correspondence is obtained. A very reliable result with respect to the thicknesses of the different N+1-layers in FIG. 3 is obtained thereby.

The mathematical model used shows that the inductance of the receiver coil, accordingly in the present case the coil 5, has a part influenced by the existence of the different layers 1 and 4 on top of the substrate in accordance with the equation $$L^s = \pi a^2 \mu_0 \int_0^\infty r e^{-\mu_0(h_s+h_r)} \frac{\lambda}{u_0} J_1^2(\lambda a) d\lambda.$$

wherein:
$L^s$=inductance of the receiver coil influenced by the measuring object 3
a=the radius of the equivalent coil
$h_S$=distance from the transmitter equivalent coil to the surface
$h_r$=distance from the receiver equivalent coil to the surface
$\lambda$=integration parameter with the dimension wave number (m$^{-1}$)
$J_1$=the Bessel function of the first order
r=reflection coefficient
$\mu 0$=magnetic permeability in free space
u0=

$$\sqrt{\lambda^2 - k_0^2} \quad ,$$

in which $K_0^2 = \overline{\omega}^2 \mu_0 \times \epsilon_0$
$\epsilon_0$=the dielectric constant in vacuum
$\overline{\omega}$=the angle frequency in radians of the alternating field By determining the inductance of the receiver coil, the thicknesses of the different layers may accordingly be calculated by introducing the electromagnetic properties of these layers. By utilizing measured values from different frequencies, and introducing different frequencies in the calculation model, it may be determined how many layers there are and what thickness they have. The magnetic permeability of one, or any, of the layers may, for instance, also be unknown and be determined through the calculation for different frequencies. However, it is also possible that the magnetic permeability, for example, of the crud layer 4 is unknown, but is determined by means separately arranged for measuring this permeability, so that it may be introduced as a known quantity in the mathematical inversion model.

Figure 4:
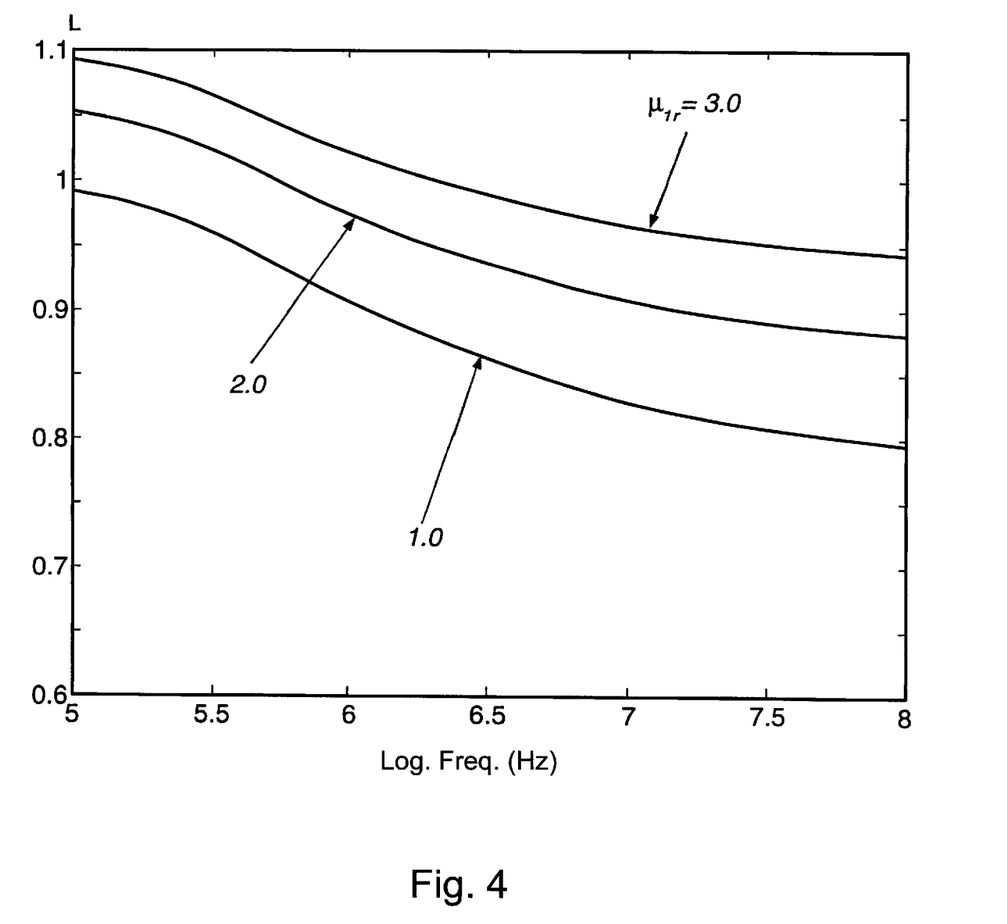
FIG. 4 is a graph illustrating how the inductance of the measuring coil of a device according to the invention is changed with the frequency of the alternating field for different values of the magnetic permeability of one of the layers, in this case the outermost of the layers in FIG. 3.
Figure 5:
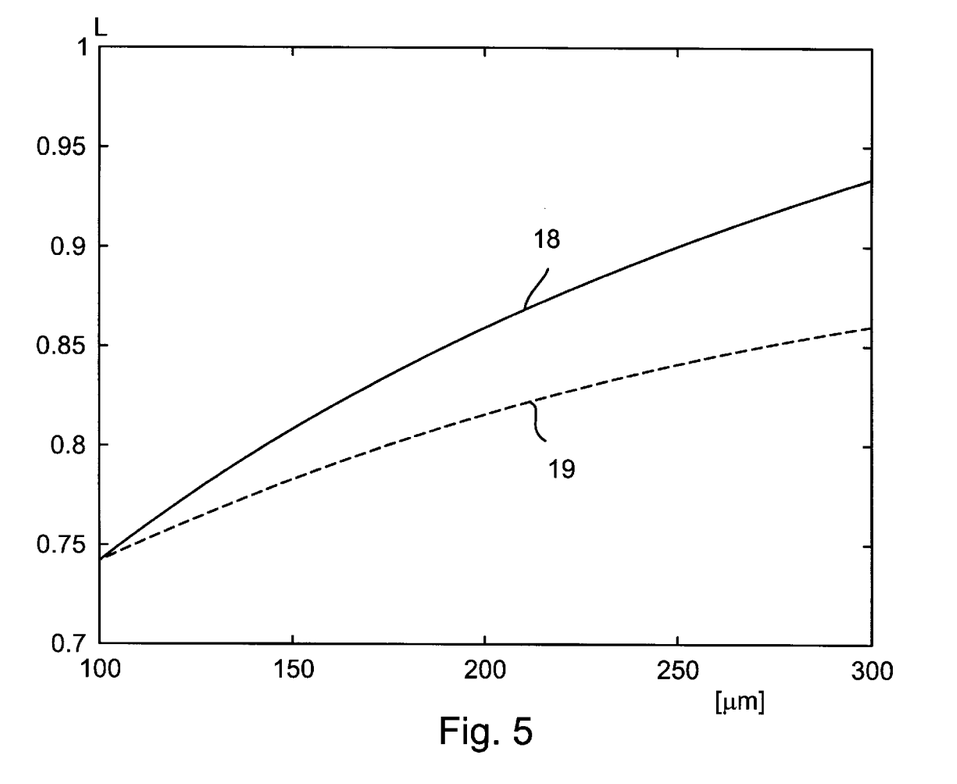
FIG. 5 is a graph illustrating how the inductance in the measurement coil for a given frequency is changed with the distance of the measuring coil to the substrate for two different values of the magnetic permeability of one of the layers, here the outermost layer.

It is illustrated in FIG. 4 how, according to the mathematical inversion model, a normalized inductance L of a receiver coil varies with the frequency for different presumed values of the relative magnetic permeability $\mu_{1r}$ of the crud layer, in which the relative magnetic permeability is set as 1 when the crud layer is unmagnetic, i.e., the same value that it has in the oxide layer. It can be seen in this figure that the inductance of this coil is influenced considerably by a change of the magnetic permeability, and it is illustrated in FIG. 5 what the distance of the coil from the substrate is at a given normalized inductance L for two different presumed values of the relative magnetic permeability. These values are then set to 1 and 2 (curve 18 and 19, respectively). It appears therefrom that it is disregarded that the crud layer is magnetic; however, it turns out that this is actually the case and it would have a relative magnetic permeability of 2. Based on this, a distance between the substrate and the coil having a value of 270 $\mu$m at a determined inductance of 0.85, is determined, while the distance is 190 $\mu$m in reality. 100 $\mu$m is then the distance between the oxide layer and the coil, so that the difference in the determined thickness of the oxide layer will be 170 $\mu$m with respect to 90 $\mu$m.

When the measurements are carried out, the coil 5 will first be adjusted so that it is correctly directed towards the layers, in this case centrally towards the substantially cylindrical fuel rod, and the measurements and the calculations are then carried out for different frequencies so as to determine the thickness of the oxide layer where the measurements have been carried out. The coil is usually after that moved to other parts of the fuel rod for determining the oxide layer thickness there, since this may vary along the rod. Furthermore, the composition and the magnetic permeability of the crud layer may vary along the rod, but this will not influence the thickness values determined when the method according to the present invention is used. An additional advantage of the invention consists in that the method is adapted to the reactor environment and to be used on radiated components, since the coil withstands such radiation.

The invention is of course not in any way restricted to the preferred embodiments described above, but several possible modifications thereof would be apparent to one skilled in the art, without departing from the basic idea of the invention. It would, for instance, be possible to arrange a separate measuring coil, which is then accordingly separated from the coil generating the alternating field, and it is also conceivable to arrange a plurality of such measuring coils so as to refine the measurements. That the alternating field is measured means that quantities used for describing the alternating field and/or are produced thereby are measured.

The substrate is considered to be the lowermost or the innermost of the layers, but it may well be thinner than the layers to be measured. Furthermore, it is possible that it is any layer other than the substrate that is of a material being a conductor of electricity and it may even be that a plurality of layers are electrically conductive, so that eddy currents are generated in several of the layers.

The definition of "members for comparing the voltage amplitude with the intensity of the current through the receiver coil" does not necessarily mean that there is a particular member for carrying out such a comparison, but it may well be that the device has information about both the amplitude and the current intensity, and these are considered in the calculation, and no direct comparison is actually carried out.

We claim:

1. A method for determining the thickness of at least one layer on a substrate, at least one of said layers or said substrate being a conductor of electricity, comprising the steps of:
    (a) generating a primary electromagnetic alternating field with a coil in the immediate vicinity of an outermost layer, whereby eddy currents are generated in said conductor which generate a secondary electromagnetic alternating field;
    (b) adjusting said primary alternating field to at least two different frequencies;
    (c) measuring the combined primary and second alternating fields at said frequencies to determine the influence of said eddy current; and
    (d) calculating the thickness of said layers in a model using said measurement and at least some electromagnetic properties of said substrate and said layers, where no electrical properties are pre-set in said model while free model parameters such as thickness and permeability are altered until said model reconstructs the measured response.

2. The method of claim 1 wherein step (d) further comprises:
    (d1) generating a first mathematic model describing said coil;
    (d2) generating a second mathematic model describing said substrate and said layers and their influence upon said combined alternating field; and
    (d3) introducing fixed values for at least some of the electromagnetic properties of the substrate and layers into said second model.

3. The method of claim 2 wherein a mathematic inversion model is used for said second mathematic model and further comprising the steps of:
    (e) introducing a presumed thickness into said mathematic inversion model on said calculation of said layer thickness;
    (f) calculating said alternating field through said first model and said mathematic inversion model;
    (g) comparing said calculated alternating field with the measurement of said alternating field;
    (h) introducing a new value for said thickness into said mathematic inversion model; and
    (i) repeating steps (f)–(g) until substantial correspondence is obtained between said calculated and said measured alternating fields.

4. The method of claim 1 wherein said electromagnetic properties include at least one of the dielectric constant, the electric conductivity, and the magnetic permeability of said substrate and layers.

5. The method of claim 1 wherein said measurement of the alternating field is done at various frequencies in order to calculate the layer thickness and electromagnetic properties that are unknown.

6. The method of claim 1 wherein step (c) is done over a range of frequencies extending over at least one order of magnitude.

7. The method of claim 6 wherein said frequency range includes at least 500 KHz–10 MHz.

8. The method of claim 1 wherein step (c) further comprises the steps of:
    placing a receiver coil close to the outer most layer;
    measuring the impedance of said receiver coil; and
    measuring the phase difference of a voltage across said receiver coil with respect to a current through said coil.

9. The method of claim 8 wherein said receiver coil and said coil are one coil.

10. The method of claim 8 further comprising the steps of:
    measuring the intensity of the current through said coil; and
    measuring the amplitude and the phase position of the voltage across said receiver coil with respect to said current.

11. The method of claim 1 wherein said layer is a metal oxide, said substrate is a metal alloy forming a wall of a fuel rod in a nuclear reactor.

12. The method of claim 11 wherein a partially magnetic layer is on top of said metal oxide and the magnetic permeability of said partially magnetic layer is accounted for in said calculation.

13. The method of claim 11 wherein said substrate is a zirconium alloy and said metal oxide is zirconium dioxide.

14. An apparatus for determining the thickness of at least one layer on a substrate, at least one of said layers being a conductor of electricity, comprising:
    first means for generating an electromagnetic alternating field;
    second means for measuring said field;
    third means, communicating with said first means, for adjusting the frequency of said electromagnetic alternating field to at least two frequencies; and fourth means, communicating with said second means, for calculating the thickness of said layer in a model using said measurement and at least some of the electromagnetic properties of said substrate and said layers, where no electrical properties are pre-set in said model while free model parameters such as thickness and permeability are altered until said model reconstructs the measured response.

15. The apparatus of claim 14 wherein said first means comprises a coil which is described by said mathematic model and said fourth means is adapted to use said model in its calculating.

16. The apparatus of claim 15 wherein said coil has a single layer of turns.

17. The apparatus of claim 15 wherein said mathematic model describes said coil as an equivalent coil having one turn.

18. The apparatus of claim 15 wherein said mathematic model describes said coil as at least two equivalent coils, a transmitter coil and a receiver coil.

19. The apparatus of claim 15 wherein said mathematical model comprises a first mathematical model describing said coil and a second mathematical model describing the constitution of said layers and said substrate and their influence on said alternating field, said fourth means further comprising means for introducing fixed values for at least some of the electromagnetic properties of said substrate and said layers into said second mathematic model.

20. The apparatus of claim 19 wherein said second model is a mathematic inversion model, said fourth means further comprising means for introducing a presumed thickness for said layer into said mathematic inversion model and means for comparing the result of the calculation with the measurement, whereby said comparison is repeated until a substantial correspondence is obtained between said calculated and measured alternating fields.

21. The apparatus of claim 14 wherein said second means comprises:
   at least a receiver coil arranged close to the outer most layer;
   means for measuring the impedance of said receiver coil; and
   means for measuring the phase difference of a voltage across said receiver coil with respect to a current flowing through a generating coil.

22. The apparatus of claim 21 wherein one coil is used as the receiving and generating coil.

23. The apparatus of claim 21 wherein said second means measures the amplitude and phase position of the voltage over said receiver coil with respect to the current through the generating coil, said second means including a means for comparing said voltage amplitude and the intensity of said current through the receiver coil.

24. The apparatus of claim 20 wherein said fourth means is adapted to use a mathematic inversion model to calculate the inductance of a coil.

* * * * *